United States Patent
Behrendt et al.

(10) Patent No.: US 7,983,168 B2
(45) Date of Patent: *Jul. 19, 2011

(54) ONE OR MORE MULTIPORT SYSTEMS TO FACILITATE SERVICING OF ASYNCHRONOUS COMMUNICATIONS EVENTS

(75) Inventors: Eileen M. Behrendt, Mahopac, NY (US); Jeffrey R. Biamonte, Hyde Park, NY (US); Raymond J. Harrington, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/419,719

(22) Filed: Apr. 7, 2009

(65) Prior Publication Data

US 2009/0196295 A1 Aug. 6, 2009

Related U.S. Application Data

(63) Continuation of application No. 10/834,799, filed on Apr. 29, 2004, now Pat. No. 7,522,524.

(51) Int. Cl.
*H04L 12/28* (2006.01)
(52) U.S. Cl. ......... 370/235; 370/360; 370/400; 370/437
(58) Field of Classification Search ................... 370/437
See application file for complete search history.

(56) References Cited

U.S. PATENT DOCUMENTS

| | | | |
|---|---|---|---|
| 4,481,572 A | 11/1984 | Ochsner | |
| 4,486,852 A | 12/1984 | Champlin et al. | |
| 4,530,092 A | 7/1985 | Hafer | |
| 4,593,282 A | 6/1986 | Acampora et al. | |
| 5,396,494 A | 3/1995 | Roposh | |
| 5,422,493 A | 6/1995 | Kestenbaum et al. | |
| 5,452,419 A | 9/1995 | DiGiulio et al. | |
| 5,488,681 A | 1/1996 | Deacon et al. | |
| 5,557,266 A | 9/1996 | Calvignac et al. | |
| 5,561,669 A * | 10/1996 | Lenney et al. | 370/352 |
| 5,724,606 A | 3/1998 | Stevens et al. | |
| 5,777,983 A | 7/1998 | Jung | |
| 5,905,728 A | 5/1999 | Han et al. | |
| 5,912,889 A | 6/1999 | Preas et al. | |
| 5,937,115 A | 8/1999 | Domash | |
| 5,999,992 A | 12/1999 | Grohoski et al. | |
| 6,094,434 A * | 7/2000 | Kotzur et al. | 370/401 |

(Continued)

OTHER PUBLICATIONS

"Common I/O And Storage Interface," W.E. Tutt, IBM Technical Disclosure Bulletin, vol. 19, No. 10, Mar. 1977, pp. 3643-3647.

(Continued)

*Primary Examiner* — Chi H. Pham
*Assistant Examiner* — Shick Hom
(74) *Attorney, Agent, or Firm* — Dennis Jung, Esq.; Kevin P. Radigan, Esq.; Heslin Rothenberg Farley & Mesiti P.C.

(57) ABSTRACT

One or more multiport systems are used to facilitate servicing of asynchronous communications events. A multiport system, such as an open collector multiport system, receives from one of a plurality of source components an asynchronous communications event directed to a target component coupled to the plurality of source components. The multiport system is controlled to provide, at any given time, a communications path between a plurality of ports of the multiport system to service the asynchronous communications event. One or more multiport systems are used to forward the event from the source to the target.

20 Claims, 4 Drawing Sheets

U.S. PATENT DOCUMENTS

| | | | |
|---|---|---|---|
| 6,446,147 B1 | 9/2002 | Dajer et al. | |
| 6,587,462 B2 | 7/2003 | Mahalingaiah | |
| 6,667,985 B1 * | 12/2003 | Drummond-Murray | 370/415 |
| 6,804,235 B2 | 10/2004 | Mahalingaiah | |
| 6,988,161 B2 | 1/2006 | McConnell et al. | |
| 7,057,414 B2 | 6/2006 | Barus et al. | |
| 7,123,614 B2 | 10/2006 | Frouin et al. | |
| 7,522,524 B2 | 4/2009 | Behrendt et al. | 370/235 |
| 2002/0156918 A1 * | 10/2002 | Valdevit et al. | 709/238 |

OTHER PUBLICATIONS

"Serial Channel Synchronizer," C. Robertson, IBM Technical Disclosure Bulletin, vol. 35, No. 2, Jul. 1992, pp. 69-74.

D. Gerakoulis et al., "A Code Division Switch For Terrestrial and Satellite Networks", pp. 509-518 (Aug. 6, 2002).

Office Action for U.S. Appl. No. 10/834,799 (U.S. Letters Patent No. 7,522,524), dated Jul. 1, 2008.

* cited by examiner

| A | B | SWITCH POSITION |
|---|---|---|
| 0 | 0 | PORT 0 ←→ PORT 1 |
| 0 | 1 | PORT 0 ←→ PORT 2 |
| 1 | 0 | PORT 1 ←→ PORT 2 |
| 1 | 1 | OPEN |

U.S. 7,983,168 B2

ONE OR MORE MULTIPORT SYSTEMS TO FACILITATE SERVICING OF ASYNCHRONOUS COMMUNICATIONS EVENTS

CROSS-REFERENCE TO RELATED APPLICATIONS

This application is a continuation of co-pending U.S. patent application Ser. No. 10/834,799, filed Apr. 29, 2004, entitled "EMPLOYING ONE OR MORE MULTIPORT SYSTEMS TO FACILITATE SERVICING OF ASYNCHRONOUS COMMUNICATIONS EVENTS," issued as U.S. Pat. No. 7,522,524 on Apr. 21, 2009, the entirety of which is hereby incorporated herein by reference.

TECHNICAL FIELD

This invention relates, in general, to communicating within communications environments, and in particular, to controlling communications between multiple sources and a single target of a communications environment.

BACKGROUND OF THE INVENTION

Communications environments exist in which multiple communications signal sources require access to a single target of the communications environment. Currently, in such environments, communications are handled using time division multiplexing, slotted time division multiplexing or analog switches. These techniques, however, have proven to be inadequate, especially for servicing asynchronous communications events.

For example, one or more of the current techniques are incapable of handling asynchronous communications, suffer from lower bandwidth, have requirements that the message size must be known and/or must remain constant or be padded, and cannot comply with industry standard protocols, such as I2C (Inter-Integrated Chip), SMbus (System Management Bus), CAN (Controller Area Network), and UART (Universal Asynchronous Receiver Transmitter). Further, the analog switch approach has the complexity of added circuitry, higher costs and lower reliability associated with more components, and higher board space usage in addition to enables needed for addressing that add extra signals that may not be available.

Based on the foregoing, a need exists for a capability that facilitates servicing of asynchronous communications events. In particular, a need exists for a capability that facilitates servicing of asynchronous communications events in an environment in which multiple source components seek access to a single target component.

SUMMARY OF THE INVENTION

The shortcomings of the prior art are overcome and additional advantages are provided through the provision of a system for facilitating servicing of asynchronous communications events. The system includes, for instance, a multiport system to obtain an asynchronous communications event; and at least one control to control the multiport system to provide a communications path between a plurality of ports of the multiport system to service the obtained asynchronous communications event, wherein at least one port of the multiport system is excluded from the communications path provided to service the obtained asynchronous communications event, and wherein the at least one control is used to dynamically select which ports of the plurality of ports are to provide the communications path for this obtained asynchronous communications event and which at least one port is to be ignored for this obtained asynchronous communications event, wherein different ports are selectable at different times.

Methods and computer program products corresponding to the above-summarized system are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, servicing of asynchronous (e.g., random) communications events is facilitated through the use of one or more multiport systems. The one or more multiport systems are used to service a communications event received from one of a plurality of source components and directed to a target component coupled to the plurality of source components. Each multiport system is designed to provide, at any given time, a communications path between two ports of the multiport system.

Figures 1, 2:
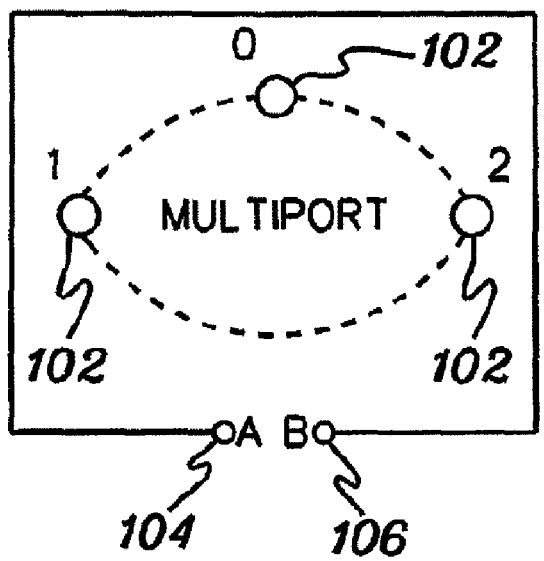
FIG. 1 depicts one example of a multiport system used in accordance with an aspect of the present invention.
FIG. 2 depicts one example of control definitions used to define a multiport system having three ports (i.e., a triport system), in accordance with an aspect of the present invention.

One example of a multiport system designed and used in accordance with an aspect of the present invention is described with reference to FIG. 1. In this particular example, a multiport system 100 is a triport system having three ports 102. Each port is implemented as an open collector bus (or open drain), and communications between the ports are controlled via an A control 104 and a B control 106. Controls 104 and 106 are, for instance, addresses, which are externally set by code, a user, an administrator, a designer, etc., as examples. These controls are not tied to the network communications or the data itself and may be set dynamically to enable communications between different ports, at different times.

The controls are set to enable, at any particular time, one port to bidirectionally communicate with another port. When a path is established between a plurality of ports (e.g., two ports), the other port(s) of the multiport system are ignored. One example of the possible settings for the controls is depicted in FIG. 2. As shown, if the controls are set to 00, then communication between Port 0 and Port 1 is enabled; 01 enables communication between Port 0 and Port 2; and 10 enables communication between Port 1 and Port 2.

Figure 3:
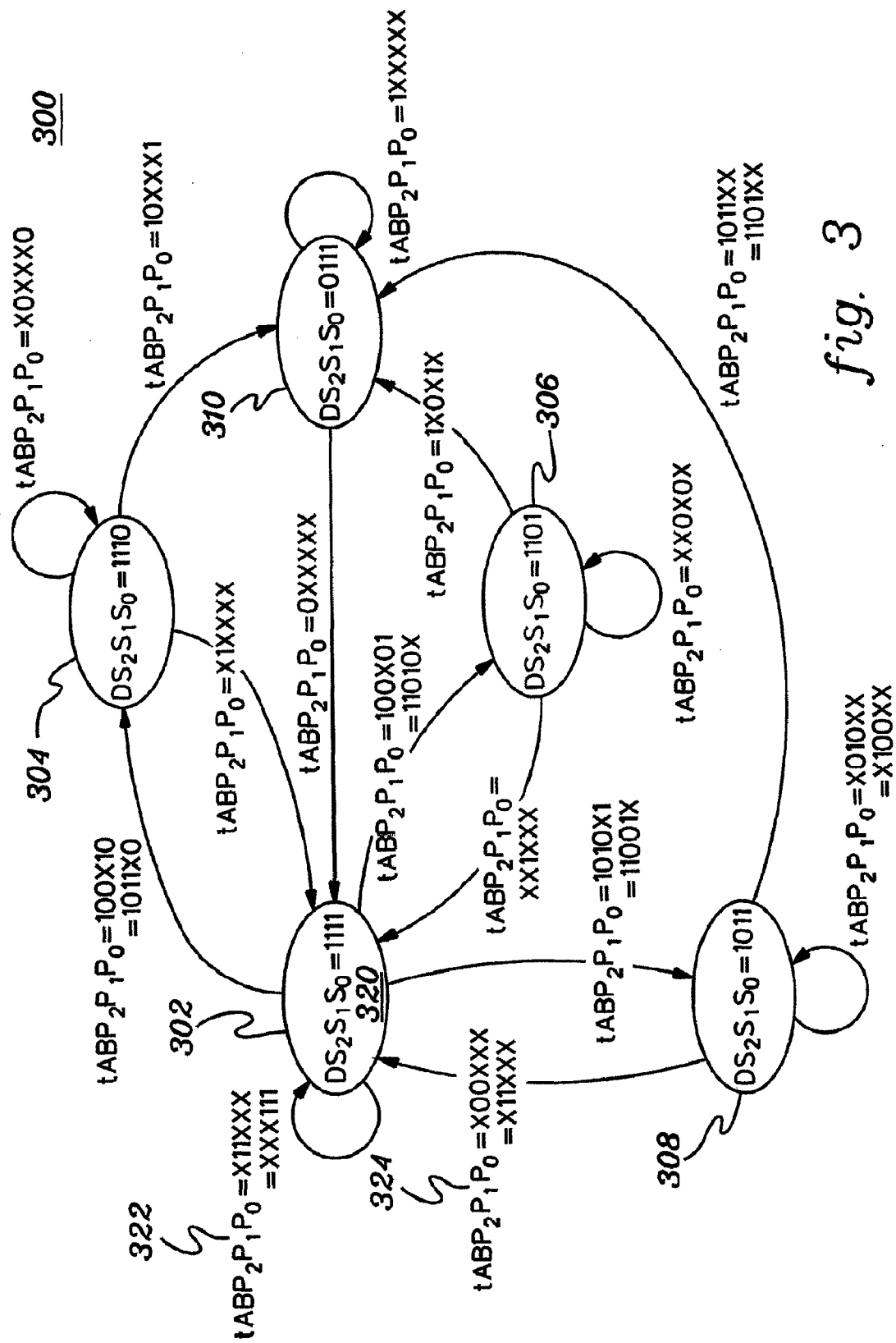
FIG. 3 depicts one example of a state diagram used to implement a multiport system, in accordance with an aspect of the present invention.

The implementation of a multiport system is realized through a state diagram, an example of which is depicted in FIG. 3. A state diagram 300 includes, for instance, an idle state 302, as well as a state for each port of the multiport system. For example, state 304 is associated with Port 0; state 306 is associated with Port 1; and state 308 is associated with Port 2. Further, in one embodiment, a delay state 310 is also provided to ensure that the outbound port is pulled up before proceeding with further communications. This state is to prevent glitches and oscillations for slow rising waveforms. It is typically unnecessary for fast rising waveforms.

Each state is represented by at least one representation 320 having a format of $DS_2S_1S_0$, wherein: D is a delay state; and $S_2$, $S_1$ and $S_0$ are bidirectional I/O port next states. The one or more inputs to a state are represented by at least one representation 322 having a format of $tABP_2P_1P_0$, wherein: t is a delay counter; A is a control bit; B is another control bit; and $P_2$, $P_1$ and $P_0$ are bidirectional I/O port present states. As an example, the idle state is represented as $DS_2S_1S_0$=1111 and two of its inputs include: $tABP_2P_1P_0$=X11XXX (322) indicating that no ports are being addressed; and $tABP_2P_1P_0$=XXX111 (322) indicating that none of the ports are communicating. These inputs maintain the multiport system in the idle state, while other inputs cause a transition from one state to the idle state. For instance, when $tABP_2P_1P_0$=X00XXX (324), there is a transition to idle state 302 from state 308. Many other inputs are also shown in FIG. 3.

In the idle state, the control signals are high (e.g., 1) and the present states are don't care (e.g., X) or vice versa. From this state, transitions occur to other states. For instance, the setting of the AB controls followed by a transition from a high to low on the corresponding addressed port causes a transition occur to a next state depending on the value of AB. As an example, if AB is set to 00 or 01, then Port 0 is to communicate resulting in a transition to state 304 represented by $DS_2S_1S_0$=1110. The inputs causing a transition to this state include $tABP_2P_1P_0$=100X10 or $tABP_2P_1P_0$=1011X0, and while in this state $tABP_2P_1P_0$=X0XXX0.

If while in state 304 the A control goes high ($tABP_2P_1P_0$=X1XXXX), an address change is indicated causing state 304 to transition back to idle state 302.

Moreover, if Port 0 is set high ($tABP_2P_1P_0$=10XXX1) indicating communications on that port is complete, a transition occurs to delay state 310 ($DS_2S_1S_0$=0111). The logic remains in this state as long as the delay counter (t) is high ($tABP_2P_1P_0$=1XXXXX). Once the delay counter goes low ($tABP_2P_1P_0$=0XXXXX), the state transitions to idle.

Similar logic and transitions are provided for Port 1 and Port 2. Further, if the multiport system includes more than three ports, then similar logic and transitions are provided for those ports.

The state diagram can be implemented in various ways. In one example, the state diagram is implemented in code written in, for instance, VHDL, and executed in a programmable device, such as a field programmable gate array (FPGA); an application specific integrated chip (ASIC); a microprocessor; or an embedded computer system, etc. The code used to implement the above-described state diagram includes, for instance, the following input encoder logic for each transition:

$P_0$->$P_1$not($c$)=not($A$)not($B$)$P_1$not($P_0$)$DS_2S_1S_0t$+not($A$)$BP_2$not($P_0$)$DS_2S_1S_0t$+$P_0$->$P_2$not($A$)not($P_0$)$DS_2S_1$not($S_0$)

$P_1$->$P_0$not($d$)=not($A$)not($B$)not($P_1$)$P_0DS_2S_1S_0t$+$A$not($B$)$P_2$not($P_1$)$DS_2S_1S_0t$+$P_1$->$P_2$not($B$)not($P_1$)$DS_2$not($S_1$)$S_0$ $P_2$->$P_0$not($e$)=not($A$)$B$not($P_2$)$P_0DS_2S_1S_0t$+$A$not($B$)not($P_2$)$P_1DS_2S_1S_0t$+$P_2$->$P_1$not($A$)$B$not($P_2$)$D$not($S_2$)$S_1S_0$+$A$not($B$)not($P_2$)$D$not($S_2$)$S_1S_0$ Delay not($f$)=not($A$)$P_0DS_2S_1$not($S_0$)$t$+not($B$)$P_1DS_2$not($S_1$)$S_0t$+not($A$)$BP_2D$not($S_2$)$S_1S_0t$+not($A$)not($B$)$P_2D$not($S_2$)$S_1S_0t$+not($D$)$S_2S_1S_0t$, such that, in each equation, + indicates an OR operation and multiplication indicates an AND operation.

Figure 4:
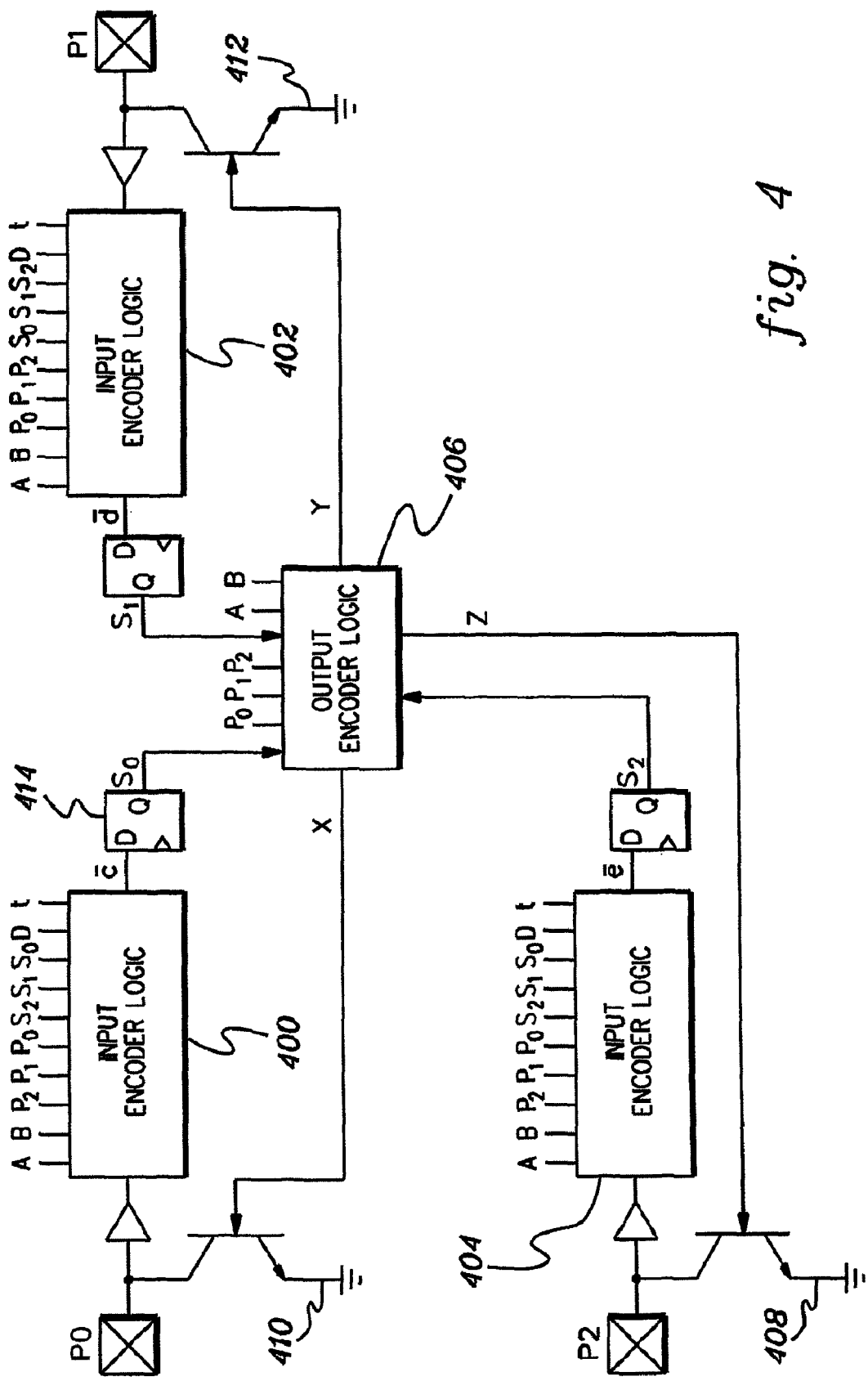
FIG. 4 depicts further details regarding a multiport system, in accordance with an aspect of the present invention.

In accordance with an aspect of the present invention, the input encoder logic is instantiated for each port of the multiport system, as depicted in FIG. 4. For example, input encoder logic 400 is instantiated for Port 0; input encoder logic 402 is instantiated for Port 1; and input encoder logic 404 is instantiated for Port 2.

In addition to the input encoder logic, a multiport system includes output encoder logic 406. The output encoder logic is used to drive a bipolar junction transistor 408, 410 or 412 in order to make the port associated therewith go low. This is part of establishing the communications path between two ports of the multiport system.

The inputs to output encoder logic 406 include A, B, $P_0$, $P_1$, $P_2$, as well as $S_0$, $S_1$ and $S_2$, which are outputs of the input encoder logic. The outputs of the output encoder logic include x, y and z and are provided by the following logic:

$x$=not($A$)not($B$)not($P_1$)not($S_1$)+not($A$)$B$not($P_2$)not($S_2$)

$y$=not($A$)not($B$)not($P_0$)not($S_0$)+$A$not($B$)not($P_2$)not($S_2$)

$z$=not($A$)$B$not($P_0$)not($S_0$)+$A$not($B$)not($P_1$)not($S_1$), such that, in each equation, + indicates an OR operation and multiplication indicates an AND operation.

Operationally, one port of the multiport system communicates with another port, as directed by one or more of the logic inputs. For instance, assume Port 0 is to communicate with Port 2. In such an example, the inputs to input encoder logic 400 include $tABP_2P_1P_0DS_2S_1S_0$=1011X01111, wherein AB is set to 01 indicating the control definition for Port 0 communicating with Port 2; Port 0 is indicated as low, since that is the port that is communicating; $P_1$ is indicated as don't care, since $P_0$ is not to communicate with $P_1$, and the remaining variables are set high. Those values are input into input encoder logic 400, which provides an output of not c. The value of not c (e.g., 0) is clocked into a D flip flop 414, providing an output of $S_0$. That value is input into output encoder logic 406, as well as $ABP_2P_1P_0$ and the other next states $S_2$ and $S_1$. The outputs of the output encoder logic, x, y and z, are used to drive bipolar junction transistors 408, 410 and 412. In this example, x=0, y=0 and z=1. Since z=1, z turns bipolar junction transistor 408 on, pulling the pin low, and setting $P_2$ to 0. Should $P_0$ still be driving the bus, then $P_0$ and $S_0$ remain low providing an input to input encoder logic 404 of 010X011011. Since x and y=0, bipolar junction transistors 410 and 412 remain off. In this example, $P_0$ is communicating with $P_2$, so $P_1$ is ignored.

Figure 5:
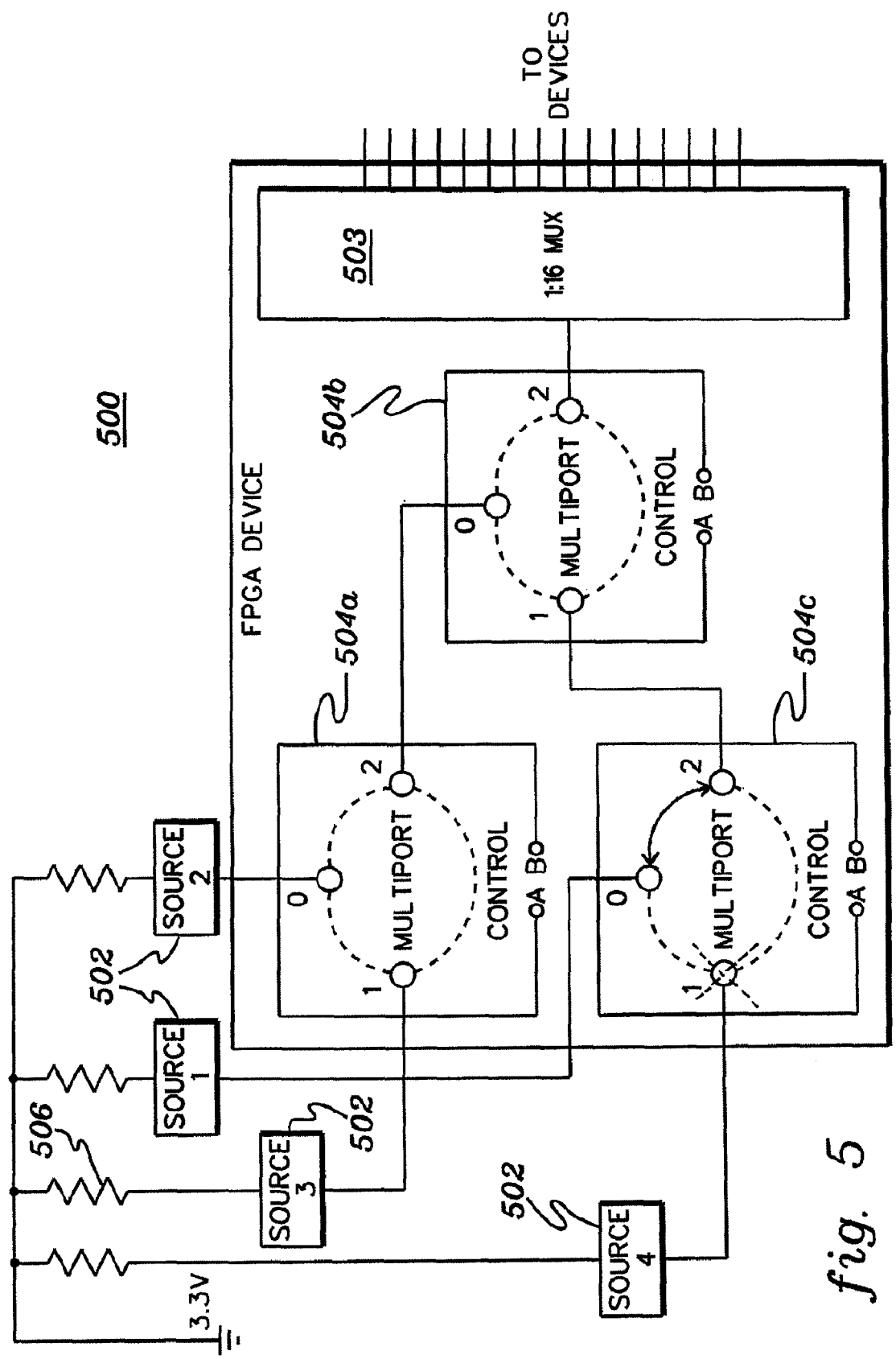
FIG. 5 depicts one embodiment of a communications environment employing a plurality of multiport systems, in accordance with an aspect of the present invention.

A multiport system is used in a communications environment, such as the one depicted in FIG. 5, to facilitate communications within the environment. As shown, a communications environment 500 includes a plurality of source components 502 coupled to a target component 503 via a plurality of multiport systems 504. For example, Source 1 (e.g., an I2C master computer) is coupled to target 503 (e.g., a multiplexer coupled to a plurality of devices, e.g., SEEPROM devices) via multiport systems 504c and 504b. In particular, Source 1 is coupled to Port 0 of multiport system 504c and a communications path is established between Port 0 and Port 2 of multiport system 504c. Port 2 of multiport system 504c is further coupled to Port 1 of multiport system 504b. A communications path is established between Port 1 of multiport system 504b and Port 2 of multiport system 504b. The output of Port 2 of multiport system 504b is coupled to target 503.

Source 1 sends an asynchronous communications event to Port 0 of multiport system 504c. This event is asynchronous in that signals travel through the multiport switch without the need of a synchronizing clock signal. No external clock signal is necessary. In one example, the event includes an indication that Port 0 is to go low and includes information, such as data, to be received by the target component. The event is considered asynchronous, since the clock signal used to change the status is not based on a communications protocol, e.g., it does not care about the data rate. Random communications is provided without requiring an instruction set or packet.

Port 0 is set up to communicate with Port 2, so AB=01 and $tABP_2P_1P_0=1011X0$. These values are input into the input encoder logic of multiport system 504b, which produces an output of $S_0=0$ providing a next state of 1110. $S_0$ is input into the output encoder logic which provides a high z (z=1) causing $P_2$ to go low, thus establishing a communications path between Port 0 and Port 2 of multiport system 504c (as shown by the arrow). In this example, for this particular event, Port 1 is ignored, as indicated by the X.

The output of Port 2 of multiport system 504c becomes the source of multiport system 504b. Using the above logic, a path is established between Port 1 and Port 2, for example, of multiport system 504b. The output of multiport system 504b is input to target 503. Thus, the asynchronous communications event is forwarded from a source to the target via the multiport systems.

In the above example, the sources are coupled to resistors 506, which are used to pull the logic high. Similarly, the outputs of the multiport systems are coupled to resistors (not shown). However, in other examples, these resistors are not needed.

Described in detail above is a multiport system that facilitates servicing of asynchronous communications events in a communications environment. In one example, the multiport system is used for data being communicated via an I2C communications protocol, but any kind of data and/or protocol can be used. The system is designed to provide a bidirectional path between ports, regardless of device type, e.g., source or target.

Advantageously, the multiport system accepts messages of unlimited sizes and complexity, offers unparalleled flexibility, is data type and data format independent, is independent of control words from a master, independent of time restraints, and provides the ability to cascade ports of variable data rates. Further, it is protocol independent. The logic used to implement the multiport system is a building block that can be instantiated multiple times, thereby providing ease in implementation.

Although in the embodiment described herein a triport system is described, it will be understood to one skilled in the art that one or more aspects of the present invention can be expanded to other numbers of ports and that a triport system is only one example. Further, one or more aspects of the present invention can be included in many different types of environments, systems and/or subsystems. As examples, one or more aspects of the present invention can be used in computers, cars, consumer electronics, etc. Further, even though the state representations are provided in binary, this is only one example. Other representations may be provided. Moreover, there may be different formats for the inputs, outputs and states. Additionally, more, less and/or different controls (e.g., AB controls), inputs and/or outputs may be employed without departing from the spirit of the present invention. Further, the one or more ports of each system can be implemented as a structure other than an open collector bus.

In addition to the above, a path may be established between more than two ports of a multiport system. However, in the examples described herein, at least one port is ignored. Moreover, although a delay is provided, in other examples, this may be eliminated. For instance, variables D and t are eliminated, as well as the delay state.

An environment may include more or less than the number of multiport systems described herein. Further, a multiport system may be implemented in many different ways, including, but not limited to, a function in software (e.g., C, assembler, etc.), in hardware, etc.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or operations described therein without departing from the spirit of the invention. For instance, operations may be performed in a differing order, or operations may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for facilitating servicing of communications events, the system comprising:
   a multiport system to obtain a communications event; and
   at least one control to control the multiport system to provide a communications path between a plurality of ports of the multiport system to asynchronously service the obtained communications event independent of any protocol of the communications event, wherein at least one port of the multiport system is excluded from the communications path provided to asynchronously service the obtained communications event, and wherein the at least one control dynamically selects, independent of any protocol of the communications event, which ports of the plurality of ports are to provide the communications path for this obtained communications event and which at least one port is to be ignored for this obtained communications event, wherein different ports are selectable at different times.

2. The system of claim 1, wherein the communications event includes information for a target component, and wherein the multiport system receives the communications event from a source component of a plurality of source components having access to the target component, and wherein signals of the communication event are transmitted across the communications path absent a synchronizing clock signal.

3. The system of claim 1, wherein the plurality of ports comprises two ports and the at least one control comprises two address controls.

4. The system of claim 1, wherein a number of controls included in the at least one control is dependent on a number of ports included in the plurality of ports.

5. The system of claim 1, wherein the at least one control is included in an implementation of a state diagram used to control the multiport system.

6. The system of claim 5, wherein the implementation of the state diagram comprises code executable on at least one of a programmable logic device, a microprocessor, an embedded computing system, and an application specific integrated chip.

7. The system of claim 1, wherein at least one port of the multiport system is one of an open collector bus and an open drain bus.

8. The system of claim 1, wherein the multiport system is included within an environment having a plurality of multiport systems coupled together.

9. A computer program product for facilitating servicing of communications events, the computer program product comprising:
   a nom-transitory storage medium readable by a processing component and storing instructions for execution by the processing component for performing a method cormprising:
   obtaining, by a multiport system, an communications event; and
   controlling, via at least one control, the multiport system to provide a communications path between a plurality of ports of the multiport system to asynchronously service the obtained communications event independent of any protocl of the communications event, wherein at least one port of the multiport system is excluded from the communications path provided to asynchronously service the obtained communications event, and wherein the controlling comprises dynamically selecting, independent of any protocol of the communications event, which ports of the plurality of ports are to provide the communications path for this obtained communications event and which at least one port is to be ignored for this obtained communications event, wherein different ports are selectable at different times.

10. The computer program product of claim 9, wherein the communications event includes information for a target component, and the obtaining comprises receiving the communications event from a source component of a plurality of source components having access to the target component, and wherein signals of the communication event are transmitted across the communications path absent a synchronizing clock signal.

11. The computer program product of claim 9, wherein the plurality of ports comprises two ports and the at least one control comprises two address controls.

12. The computer program product of claim 9, wherein a number of controls included in the at least one control is dependent on a number of ports included in the plurality of ports.

13. The computer program product of claim 9, wherein the at least one control is included in an implementation of a state diagram used to control the multiport system.

14. The computer program product of claim 13, wherein the implementation of the state diagram comprises code executable on at least one of a programmable logic device, a microprocessor, an embedded computing system, and an application specific integrated chip.

15. The computer program product of claim 9, wherein at least one port of the multiport system is one of an open collector bus and an open drain bus.

16. The computer program product of claim 9, wherein the multiport system is included within an environment having a plurality of multiport systems coupled together.

17. A method of facilitating servicing of communications events, the method comprising:
   obtaining, by a multiport system, a communications event; and
   controlling, via at least one control, the multiport system to provide a communications path between a plurality of ports of the multiport system to asynchronously service the obtained communications event independent of any protocol of the communications event, wherein at least one port of the multiport system is excluded from the communications path provided to asynchronously service the obtained communications event, and wherein the controlling comprises dynamically selecting; independent of any protocol of the communications event, which ports of the plurality of ports are to provide the communications path for this obtained communications event and which at least one port is to be ignored for this obtained communications event, wherein different ports are selectable at different times.

18. The method of claim 17, wherein the communications event includes information for a target component, and wherein the multiport system receives the communications event from a source component of a plurality of source components having access to the target component, and wherein signals of the communication event are transmitted across the communications path absent a synchronizing clock signal.

19. The method of claim 17, wherein the at least one control is included in an implementation of a state diagram used to control the multiport system, and wherein the implementation of the state diagram comprises code executable on at least one of a programmable logic device, a microprocessor, an embedded computing system, and an application specific integrated chip.

20. The method of claim 17, wherein the multiport system is included within an environment having a plurality of multiport systems coupled together.

* * * * *